(12) United States Patent
Vankov et al.

(10) Patent No.: US 8,700,958 B2
(45) Date of Patent: *Apr. 15, 2014

(54) MULTI-VARIATE NETWORK SURVIVABILITY ANALYSIS

(75) Inventors: Vanko Vankov, Portland, OR (US); Vinod Jeyachandran, Rockville, MD (US); Pradeep K. Singh, Arlington, VA (US); Alain J. Cohen, McLean, VA (US); Shobana Narayanaswamy, Kensington, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,623

(22) Filed: Mar. 6, 2012

(65) Prior Publication Data
US 2013/0007524 A1 Jan. 3, 2013

Related U.S. Application Data

(63) Continuation of application No. 11/834,058, filed on Aug. 6, 2007, now Pat. No. 8,135,990.

(60) Provisional application No. 60/822,130, filed on Aug. 11, 2006.

(51) Int. Cl.
*G06F 11/00* (2006.01)
(52) U.S. Cl.
USPC ............... 714/33; 714/4.1; 714/46; 714/57
(58) Field of Classification Search
USPC .......................................... 714/4, 33, 46, 57
See application file for complete search history.

(56) References Cited

U.S. PATENT DOCUMENTS

| | | | |
|---|---|---|---|
| 5,375,199 A | 12/1994 | Harrow et al. | |
| 5,440,719 A * | 8/1995 | Hanes et al. | 703/21 |
| 5,699,403 A * | 12/1997 | Ronnen | 379/15.04 |
| 5,819,028 A * | 10/1998 | Manghirmalani et al. | 714/57 |
| 5,862,362 A * | 1/1999 | Somasegar et al. | 703/21 |
| 6,006,016 A * | 12/1999 | Faigon et al. | 714/48 |
| 6,061,724 A | 5/2000 | Ries et al. | |
| 6,313,768 B1 | 11/2001 | Allen | |
| 6,449,739 B1 | 9/2002 | Landan | |
| 6,529,954 B1 | 3/2003 | Cookmeyer et al. | |
| 6,560,720 B1 * | 5/2003 | Chirashnya et al. | 714/32 |
| 6,708,291 B1 * | 3/2004 | Kidder | 714/39 |
| 6,757,727 B1 * | 6/2004 | Ivory | 709/224 |
| 6,781,959 B1 | 8/2004 | Garakani et al. | |
| 6,801,940 B1 | 10/2004 | Moran et al. | |
| 6,810,496 B1 * | 10/2004 | Vittal | 714/57 |
| 6,871,227 B2 | 3/2005 | Allen | |
| 6,975,330 B1 | 12/2005 | Charlton et al. | |

(Continued)

*Primary Examiner* — Philip Guyton
(74) *Attorney, Agent, or Firm* — Robert M. McDermott

(57) ABSTRACT

Network survivability is quantified in such a way that failure cases can be compared and ranked against each other in terms of the severity of their impact on the various performance measures associated with the network. The degradation in network performance caused by each failure is quantified based on user-defined sets of thresholds of degradation severity for each performance measure. Each failure is simulated using a model of the network, and a degradation vector is determined for each simulated failure. A comparison function is defined to map the degradation vectors into an ordered set, and this ordered set is used to create an ordered list of network failures, in order of the network degradation caused by each failure.

12 Claims, 2 Drawing Sheets

(56) References Cited

U.S. PATENT DOCUMENTS

| | | |
|---|---|---|
| 6,983,401 B2 * | 1/2006 | Taylor ............... 714/45 |
| 7,010,593 B2 | 3/2006 | Raymond |
| 7,028,228 B1 * | 4/2006 | Lovy et al. ............ 714/57 |
| 7,111,206 B1 * | 9/2006 | Shafer et al. .......... 714/48 |
| 7,197,559 B2 | 3/2007 | Goldstein et al. |
| 7,218,928 B2 | 5/2007 | Park et al. |
| 7,290,048 B1 | 10/2007 | Barnett et al. |
| 7,293,287 B2 | 11/2007 | Fischman et al. |
| 7,392,234 B2 | 6/2008 | Shaath et al. |
| 7,467,202 B2 | 12/2008 | Savchuk |
| 7,504,936 B2 * | 3/2009 | Miller et al. ............ 340/506 |
| 7,509,229 B1 | 3/2009 | Wen |
| 7,546,368 B2 | 6/2009 | Drees et al. |
| 7,577,689 B1 | 8/2009 | Masinter et al. |
| 7,583,587 B2 * | 9/2009 | Qiu et al. .............. 370/216 |
| 7,593,351 B1 | 9/2009 | Zioulas et al. |
| 7,606,165 B2 | 10/2009 | Qiu et al. |
| 7,617,086 B2 * | 11/2009 | Okada et al. .......... 703/21 |
| 7,730,172 B1 | 6/2010 | Lewis |
| 7,891,000 B1 | 2/2011 | Rangamani et al. |
| 7,925,729 B2 | 4/2011 | Bush et al. |
| 7,954,144 B1 | 5/2011 | Ebrahimi et al. |
| 7,979,522 B2 | 7/2011 | Lunsford |
| 7,984,126 B2 | 7/2011 | Mcbride |
| 2002/0078195 A1 | 6/2002 | Allen |
| 2002/0124070 A1 | 9/2002 | Pulsipher |
| 2002/0198985 A1 | 12/2002 | Fraenkel et al. |
| 2003/0065986 A1 | 4/2003 | Fraenkel et al. |
| 2003/0131098 A1 | 7/2003 | Huntington et al. |
| 2003/0135612 A1 | 7/2003 | Huntington et al. |
| 2003/0187967 A1 * | 10/2003 | Walsh et al. ............ 709/223 |
| 2004/0049693 A1 | 3/2004 | Douglas |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2005/0064820 A1 | 3/2005 | Park et al. |
| 2005/0102402 A1 | 5/2005 | Whitehead |
| 2005/0108379 A1 | 5/2005 | Gray et al. |
| 2005/0195797 A1 | 9/2005 | Kryuchkov et al. |
| 2006/0190480 A1 | 8/2006 | Ori et al. |
| 2006/0190488 A1 | 8/2006 | Cohen et al. |
| 2006/0274684 A1 | 12/2006 | Diener |
| 2008/0263112 A1 | 10/2008 | Shaath et al. |
| 2009/0204704 A1 | 8/2009 | Muret et al. |
| 2011/0167145 A1 | 7/2011 | Bush et al. |
| 2011/0213869 A1 | 9/2011 | Korsunsky et al. |

* cited by examiner

MULTI-VARIATE NETWORK SURVIVABILITY ANALYSIS

CROSS REFERENCE TO RELATED APPLICATIONS

This application is a continuation of U.S. patent application Ser. No. 11/834,058, now U.S. Pat. No. 8,135,990, filed Aug. 6, 2007, entitled "MULTI-VARIATE NETWORK SURVIVABILITY ANALYSIS," which claims the benefit of U.S. Provisional Patent Application 60/822,130, filed Aug. 11, 2006 and U.S. Non-Provisional application Ser. No. 11/834,058, filed Aug. 6, 2007, both of which are expressly incorporated by reference herein in their entirety.

BACKGROUND AND SUMMARY OF THE INVENTION

This invention relates to the field of network analysis and network management, and in particular to a method and system for assessing and ranking the effects of failures within a network based on multiple measures of system performance.

With the increased demands for information access, network reliability has become a paramount consideration, and a variety of schemes have been developed to assure at least some degree of communications among nodes of a network in the event of failures within the network. Rarely will a failure on a single device on a modern network cause the network to 'fail', per se.

The increased robustness of networks introduces new demands for effective network management. A primary goal for effective network management is to assure virtually continuous operation of the network despite equipment failures. To achieve this goal, the dependency of the network on any particular device should be minimized. However, once the network's basic operation is assured regardless of a failure on any particular device, the assessment of the significance of each device's proper operation on the overall performance of the network becomes ambiguous. That is, if a particular device can cause the network to fail, it is easy to identify this device as a critical device, and measures can be taken to provide alternative paths on the network to eliminate this critical dependency. After all such critical dependencies are eliminated, however, it is difficult to determine where additional safeguards should be provided to minimize the effects of any particular fault on the network's performance.

A variety of criteria are commonly used to assess the effects of a device failure on the overall performance of the network. For example, in some environments, the overall decrease in network bandwidth resulting from a device failure may be considered a viable indicator of the significance of the device to network performance. In other environments, the number of users affected by the failure may be considered a viable indicator; in yet others, the indicators may include the number of switched paths affected by the failure, the number of virtual networks affected by the failure, the number of saturated links caused by the failure, and so on. In general, however, a true assessment of a device's significance in a network includes a combination of such criteria, at which point a comparison of these significances becomes difficult. For example, if one device's failure affects bandwidth more significantly than another device's failure, but this other device's failure affects more switched paths, it is difficult to assess which of these devices are of higher priority for implementing additional safeguards.

Generally, a failure condition affects many aspects of system performance, and different failure conditions will affect different aspects of system performance in different degrees. Because each aspect of system performance is generally measured differently, it is difficult to quantitatively compare the effects of a failure condition on the different aspects of system performance. For example, is a 20% loss in bandwidth 'better' or 'worse' than a loss of service to 2% of the clients? Or, is this loss of service to 2% of the clients 'better' or 'worse' than a loss of one Label Switched Path (LSP)? Is the loss of one LSP 'better' or 'worse' than the loss of two links? And so on.

Further compounding the difficulty in comparing the relative significance of device failures on network performance is the 'non-linearity' that typically exists between the measures of performance and the significance of a change in that measure. For example, a ten percent decrease in bandwidth may be considered a 'minor' problem, while a twenty percent decrease may be considered 'major', and a fifty percent decrease may be considered unacceptable. In like manner, if one failure affects "N" users, while another failure affects "2*N" users, the significance of the second failure may not be twice the significance of the first failure. This other 2*N-user failure may, in fact, have the same significance as the N-user failure in some environments, while in other environments, it may have more than twice the significance.

It would be advantageous to provide a comparative measure for assessing the significance of a failure on multiple aspects of the performance of a network. It would also be advantageous for this comparative measure to reflect the relative degree of significance of each aspect, regardless of the characteristics of the particular measures used to quantify each aspect.

These advantages, and others, can be realized by a method and system that quantifies "network survivability" in such a way that failure cases can be compared and ranked against each other in terms of the severity of their impact on the performance of the network. A rank ordering system is provided to quantify the degradation in network performance caused by each failure, based on user-defined sets of thresholds of performance degradation. Each failure is simulated using a model of the network, and a degradation vector is determined for each simulated failure. To provide for an ordered comparison of degradation vectors, a degradation distribution vector is determined for each failure, based on the number of times each degradation threshold level is exceeded in each performance category. A comparison function is defined to map the degradation vectors into an ordered set, and this ordered set is used to create an ordered list of network failures, in order of the network degradation caused by each failure.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The invention is presented in the context of a conventional data communications network. One of skill in the art will recognize, however, that the principles presented herein can be applied to any network of elements wherein the performance of the network is observably affected by abnormal behavior among the elements. For ease of reference, the occurrence of such abnormal behavior is termed a 'failure', or 'failure condition', without necessarily implying a total lack of operation of the element(s), as discussed further below.

Figure 1:
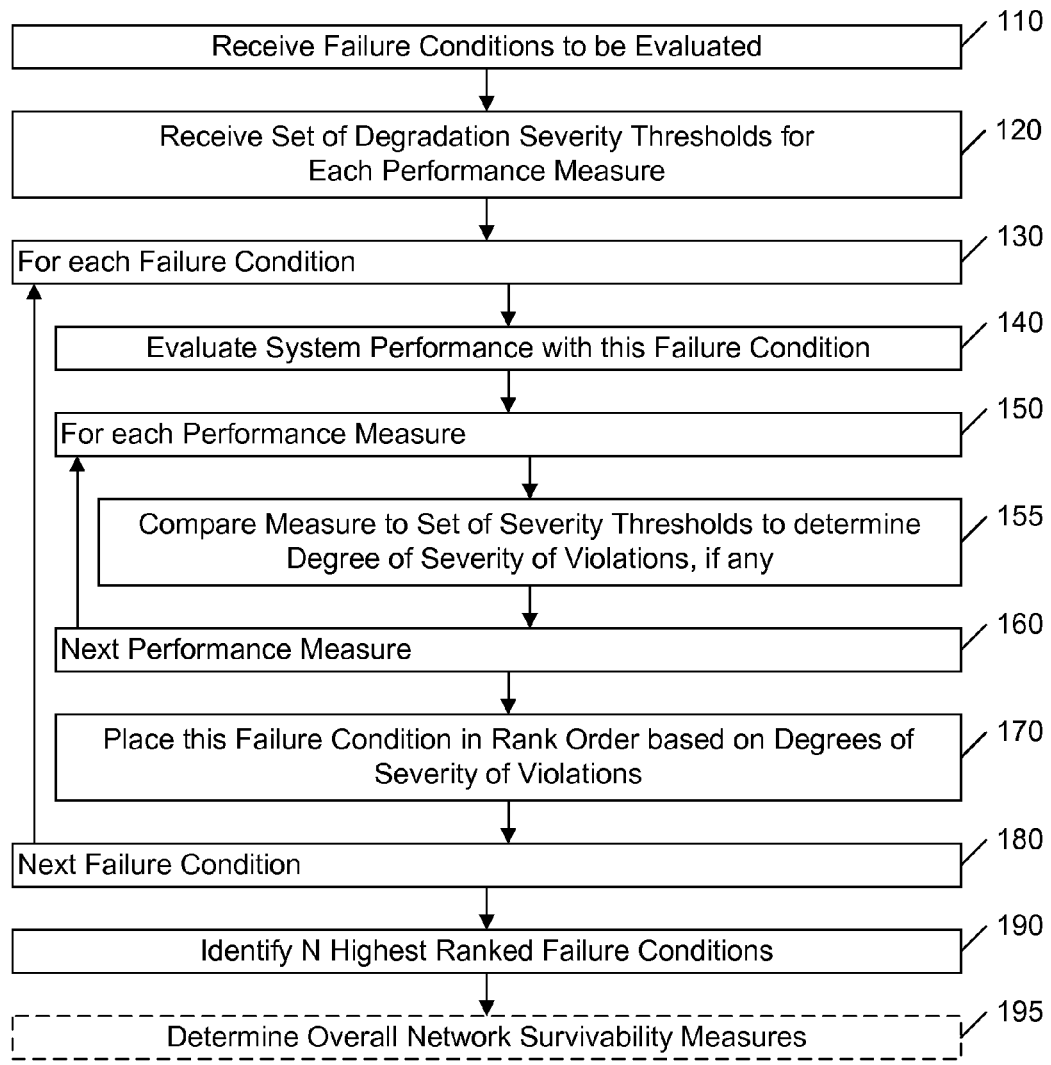
FIG. 1 illustrates an example flow diagram for determining most significant failure conditions with respect to network performance degradation in accordance with this invention.

FIG. 1 illustrates an example flow diagram for determining most significant failure conditions with respect to network performance degradation. At 110, a plurality of potential failure conditions is received. In a preferred embodiment of this invention, the user identifies a plurality of fault conditions that are to be evaluated and compared. Any of a variety of techniques can be used to enable this identification. If a graphic interface is provided that illustrates the network, the user can 'click' on devices or links that are to be evaluated. A text interface may also, or alternatively, be provided, wherein the user identifies elements in a network list, or specifies elements or groups of elements using Boolean or other 'rule' operatives, such as "all elements having a name prefix of "ny", or "all links in virtual network VN1234, except L17 and L24", and so on. In like manner, the specifics of each fault may be specified, such as: "failure of port 2 on router ny234", "loss of half the bandwidth of link L235", "no TCP communications at node dc567", and so on. The failure condition may also include multiple concurrent failures, such as "loss of link L123 and failure of node 3 on switch S234". Generally, the specification of fault conditions is only limited by an ability to determine an effect of the fault condition on the performance of the network.

In addition to receiving the identification of fault conditions to be assessed, a set of performance degradation thresholds is also received, at 120. In accordance with an aspect of this invention, a user interface is provided to enable a user to identify 'degrees of severity' of performance degradation. For example, a user may specify 'minor', 'medium', and 'major' degrees of severity, or may specify severity on a numeric scale from 0 to 10, or a color scale that includes 'green', 'yellow', 'orange', 'red', and so on. By mapping measures of performance for each different performance metric to these defined degrees of degradation severity, a normalization of these measures of performance is achieved, such that comparisons can be made among the different performance measures relative to the degree of severity. That is, for example, to compare a particular loss of bandwidth to the loss of a particular number of LSPs, each of these losses is mapped to a degree of severity of performance degradation, and these resultant degrees of degradation severity are compared to determine which loss is considered more severe. Any of a variety of measures and thresholds can be defined, however the set of performance degradation thresholds for each measure should generally be monotonic, to avoid inconsistent or anomalous assessments.

Figures 2A, 2B:
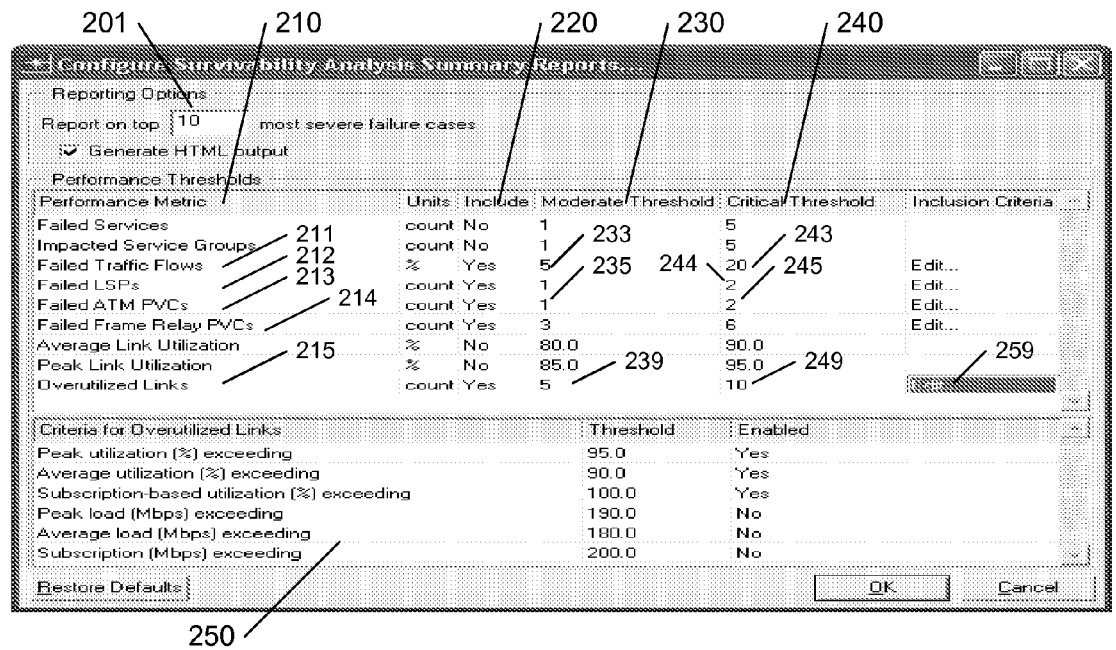
FIG. 2A illustrates an example user interface for enabling a user to control select aspects of an embodiment of this invention.
FIG. 2B illustrates an example output screen provided by an embodiment of this invention.

FIG. 2A illustrates an example user interface for defining degradation thresholds for a variety of typical performance parameters/metrics. The interface of FIG. 2A allows a user to select the set of performance metrics 210 to include 220 for creating the survivability vector for each failure case. An assortment of predefined performance metrics 210 are provided, including a count of the number of failed services, a count of the number of impacted service groups, the percentage of failed traffic flows, and so on. In a preferred embodiment, the user is also provided the option of creating new performance metrics; virtually any aspect of network behavior that can be measured in some manner can be used as a performance metric. In column 220, the user selects the aspects of network behavior that are considered relevant to the correct functioning of the network. For example, if their particular network has no services configured, or if the correct working of the configured services is not considered important in itself, the "Failed Services" metric need not be included in the failure assessment. In the example of FIG. 2A, the user has selected the performance metrics of Traffic Flows 211, LSPs 212, ATM PVCs 213, Frame Relay PVCs 214, and Overutilized Links 215 for assessing the degradation of the network caused by each failure condition.

For each selected performance category, a set of degradation thresholds can be specified by the user, each threshold corresponding to a different degree of severity. In the example of FIG. 2A, only two degrees of severity are illustrated, "moderate" 230 and "critical" 240, although the number of degrees of severity, and their nomenclature, can be user-controlled as well. In a preferred embodiment, default thresholds are provided for each performance metric, and the user is provided the option of modifying each. In the example of FIG. 2A, the user has specified that the failure of one ATM PVCs would be considered a "moderate" degradation 235, while the failure of two ATM PVCs would be considered a "critical" degradation 245. In like manner, the occurrence of five Overutilized Links is considered a "moderate" degradation 239, while the occurrence of ten Overutilized Links is considered a "critical" degradation 249.

In a preferred embodiment, the user is also provided the option of further specifying the criteria used for determining whether a particular degradation is considered to have occurred. For example, a number of factors may be considered to define whether a particular link is "overutilized". Overutilization may be based, for example, on the peak utilization or the average utilization. In like manner, some services may be provided on a subscription basis, and an overutilization may be defined in terms of an inability to provide the subscribed service, without regard to unsubscribed services. As illustrated in the lower panel 250 of FIG. 2A, when the user chooses to edit a metric 259, the lower panel 250 allows the user to specify the individual characteristics of the link that would cause the link to be considered an "Overutilized Link". In this example, a link will be considered overutilized if its peak utilization exceeds 95%, or its average utilization exceeds 90%, or its subscription-based utilization exceeds 100%. The performance metric "Overutilized Links" then represents the number of links considered overutilized according to these criteria. In this embodiment, the occurrence of any of the enabled criteria constitutes an occurrence of an "Overutilized Link"; in other embodiments, the user is provided the option of defining more complex sets of criteria, typically using Boolean or other logic statements.

The loop 130-180 of FIG. 1 assesses each of the failure conditions that were defined at 110. At 140, the effect of the failure condition on each of the network's performance measures is determined. Such a determination can be provided via any of a number of techniques, including but not limited to, simulation of a model of the network without any failures, and simulation of the model with the failure condition imposed. Each failure condition can be expected to have different effects on the performance of the network, and thus the evaluation of the network under each failure condition can be expected to provide a different set of resultant values of the measure of performance for each performance metric.

FIG. 2B illustrates an example failure assessment report. The different failure conditions are listed in column 260, with the results of their affect on the network on each of the performance metrics 211-215.

The loop 150-160 of FIG. 1 assesses each of the resultant performance measures for the current failure condition to determine the severity of the degradation, if any, of the network performance. Each of the performance measures is compared to the aforementioned (120) set of degradation criteria for the current performance measure. The degree of severity of degradation for each performance measure for each failure condition is defined as the highest threshold level exhibited by the performance of the network under this failure condition.

Using the example of FIGS. 2A and 2B, the "PE1" 263 failure condition results in 13% degradation in traffic flows 211. In FIG. 2A, the user has defined 5% as the threshold 233 for considering the degradation as "moderate", and a 20% degradation 243 as "critical". Thus, this 13% degradation in traffic flows 211 is deemed to have a degree of severity of "moderate". This PE1 263 failure condition also causes two LSPs to fail. In FIG. 2A, the failure of 2 LSPs is considered a "critical" degradation 244; thus this degradation in the number of supported LSPs 212 is deemed to have a degree of severity of "critical".

In a preferred embodiment, the degree of severity is indicated with each illustrated performance degradation; in the example of FIG. 2B, each of the arrowheads to the left of each measure is color-coded to indicated the resultant degree of severity. Additionally, as detailed further below, the list of failure conditions in FIG. 2B is presented in rank order, from most significant failure condition to least. At 201 in FIG. 2A, the user is provided the option of specifying the number of failure conditions to report; and in this example, the "top 10" failure conditions are listed in FIG. 2B, in rank order.

In a preferred embodiment of this invention, a degradation vector is used to define the degree of severity of degradation resulting from each failure condition. Using the example of FIGS. 2A and 2B, the degradation vector is arranged based on the performance measures being assessed:

D(fc)={d(Traffic Flows), d(LSPs), d(ATM PVCs), d(Frame PVCs), d(Overutilizations)}.

Thus, the degradation vector for the PE1 263 failure condition is:

D(PE1)={moderate, critical, none, moderate, none}.

In like manner, the degradation vector for the Atlanta 264 failure condition is:

D(At1)={critical, none, none, moderate, none}.

Using a numeric scale of 0=none, 1=moderate, and 2=critical, these degradation vectors can be expressed as:

D(PE1)={1, 2, 0, 1, 0};
D(At1)={2, 0, 0, 1, 0}.

That is, in accordance with a first aspect of this invention, the effects of each failure condition on the multiple measures of system performance are quantified based on a user defined degree of severity for performance degradations experienced in each of the performance measures.

At 170 in FIG. 1, the set of degrees of degradation severity caused by each failure condition is used to rank order the failure conditions. Any of a variety of techniques can be used to effect this rank ordering. For example, the Euclidean norm, or other norm of the degradation vector can be used to determine the overall severity of each failure condition, and the failure conditions can be rank ordered based on this norm. Such a measure, however, implies a numeric/quantitative relationship among the degrees of severity; that is, in the above example, four "moderate" degradations would have the same effect on the Euclidean norm of the vector as a single "critical" degradation. Optionally, the user can be provided the option of defining the aforementioned numeric scale that is applied to the degrees of severity. For example, instead of assigning a value of "2" to "critical" degradations, the user may specify a value of "10", thereby giving failure conditions that cause "critical" degradations substantially more significance than those that cause "moderate" degradations. In some environments, a norm or some other algebraic measure may be an effective assessment of the overall effect of each failure condition, whereas in other environments, it may be considered inappropriate.

In many environments a "critical" degradation may be considered to be unacceptable, and a failure condition that includes at least one critical rating would be considered of higher priority for corrective action than any other failure condition that includes only moderate ratings, regardless of the number of performance measure degradations having a moderate rating. In like manner, in such an environment, a failure condition that produces two critical ratings would be considered of higher priority than a failure condition that produces one critical rating. Similarly, if there are no critical ratings, a failure condition that produces two moderate ratings would be considered of higher priority than a failure condition that produces one moderate rating. That is, in such an environment, the magnitude of degradation is comparable within a given degree of severity, but not between degrees of severity.

In a preferred embodiment of this invention, the number of occurrences of the highest degree of severity is used to rank order the fault conditions. If a tie occurs, the number of occurrences of the next lower degree of severity is used to break the tie and further rank order the fault conditions. If the next lower degree of severity also results in a tie, the number of occurrences of the next-next lower degree of severity is used to break the tie and further rank order the fault conditions, and this tie-breaking process is repeated through each of the remaining lower degrees of severity. That is, the rank ordering is based on the number of thresholds exceeded at a highest degree of severity at which the number of threshold violations differs between the failure conditions In the example of FIG. 2B, fault conditions SF 261 and DC 262 each have two "critical" ratings, and thus are considered of higher priority than all fault conditions that have fewer "critical" ratings 270. Fault conditions PE1 263 and Atlanta 264 each have one "critical" rating, and thus are tied at that level; at the next lower severity level, PE1 263 has two "moderate" ratings, whereas Atlanta 264 only has one "moderate" rating. Therefore, failure condition PE1 263 is considered to have more of an adverse impact on system performance than failure condition Atlanta 264, which accounts for PE1 263 being listed above Atlanta 264 in FIG. 2B.

Thus, in accordance with the various aspects of this invention, the use of definable thresholds for distinguishing among degrees of degradation severity in each of the many metrics used for assessing network performance provides for a quantifiable assessment of network degradation for each failure condition, and the ranking of these quantifiable assessments according to a defined ordering rule allows for the identification of the failure conditions that have the greatest impact on network performance.

Additionally, the aforementioned quantifiable assessments of individual failure conditions can provide for an overall assessment of a network's "survivability", at 195. For example, a network that has few fault conditions that would cause "critical" degradation can be considered more robust than a network that has many fault conditions that would cause "critical" degradation, because the likelihood of one of many fault conditions occurring is generally greater than the likelihood of one of only a few fault conditions occurring. In an example embodiment of this invention, if only 5% of the possible fault conditions will cause a "critical" degradation, the network can be considered to have a "survivability score" of 95%.

Other measures of overall network survivability will be evident to one of skill in the art in view of this disclosure. For example, if each of N fault conditions is considered equally likely to occur, the characteristics of the degradation vector of the fault condition that lies at the N/2 point in the ordered list can be considered to be characteristic of an "average" fault. That is, for example, a statement such as "the average fault will likely incur no critical degradations and two moderate degradations" may be based on the occurrences of such degradations at the N/2 ordered fault condition. In like manner, other statistics may be generated based on the distribution of degrees of degradation severity among the various fault conditions.

Figure 3:
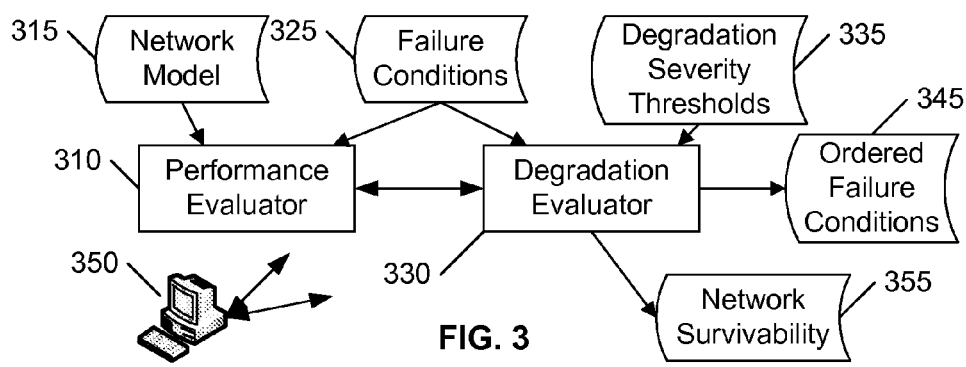
FIG. 3 illustrates an example block diagram of a failure analysis system in accordance with this invention.

FIG. 3 illustrates an example failure analysis system that embodies aspects of this invention. As detailed above, the user is provided an interface 350 for communicating information to and from the operating components 310, 330, for creating and/or editing one or more of the input data 315, 325, 335, and for receiving one or more of the output data 345, 355.

The performance evaluator 310 is configured to evaluate the performance of a network, typically based on a network model 315. Conventionally, a simulator is used to effect this performance evaluation, although other evaluation techniques common in the art may also be used. The performance evaluator 310 is also configured to model fault conditions 325 and to determine the resultant performance of the network subject to each fault condition, or multiple combinations of fault conditions, preferably under control of a degradation evaluator 330. As discussed above, the evaluation of network performance comprises a determination of a variety of performance measures for each fault condition.

The degradation evaluator 330 is configured to assess the network performance reported by the performance evaluator 340 for each modeled fault condition, based on a defined set of degradation severity thresholds 335, as detailed above. The resultant assessment of each performance measure provides an indication of the degree of degradation severity relative to each performance metric, and the degradation evaluator 330 rank-orders the failure conditions 345 based on this degree of degradation severity. As detailed above, the rank-ordering can be performed using any of a variety of techniques that are able to map the sets of degrees of degradation severity to an ordered set. Example techniques include determining and comparing a relative 'magnitude' of each set, determining and comparing a number of occurrences of each degree of degradation severity, and so on.

Optionally, the degradation evaluator 330 is also configured to provide an assessment of the network's overall 'survivability', based on the degrees of degradation severity caused by each potential fault condition. This assessment can be performed using any of a variety of techniques, including determining a likelihood of the network experiencing a highest degree of degradation severity due to a fault, determining a typical degree of degradation severity caused by a representative fault, and so on, as discussed above.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although this invention is presented using 'degradation' thresholds, corresponding to a loss in performance, one of skill in the art will recognize that the measures corresponding to achieving a given level of performance may equivalently be used. That is, for example, the degrees of severity can be defined as not achieving a given level of performance, instead of exceeding a given level of degradation. In like manner, degrees of performance achievement may be correspondingly substituted for the degrees of severity of degradation used herein, and the number of times a performance threshold is exceeded can be used as the quantitative measure of a failure (or lack of failure) condition's effect on system performance. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

What is claimed:

1. A system for assessing failures in a network, said system comprising:
   a user interface that is configured to receive a plurality of user-specified potential failure conditions that have not yet occurred within the network; and
   at least one processor configured by to:
      simulate each of the plurality of failure conditions on a model of the network, determine a performance of the model of the network under each of the plurality of failure conditions, the performance being defined by a plurality of performance measures, map each performance measure of each failure condition to one of a plurality of degrees of degradation severity, and order the plurality of failure conditions in a rank order based on the degree of degradation severity of each performance measure for each failure condition.

2. The system of claim 1, wherein the user interface is configured to provide information for displaying an ordered list of select failure conditions based on the rank ordering.

3. The system of claim 1, wherein the user interface is configured to receive from a user a set of criteria associated with one or more degradation parameters.

4. The system of claim 1, wherein the user interface is configured to provide information for displaying the performance measures for one or more failure conditions, including an indication of the degree of degradation severity associated with each performance measure.

5. A non-transitory computer-readable medium that includes a program that, when executed by a processor, causes the processor to:

receive a plurality of user-specified potential failure conditions that have not yet occurred within the network;

simulate each of the plurality of failure conditions on a model of the network, determine a performance of the model of the network under each of the plurality of failure conditions, the performance being defined by a plurality of performance measures, map each performance measure of each failure condition to one of a plurality of degrees of degradation severity, and order the plurality of failure conditions in a rank order based on the degree of degradation severity of each performance measure for each failure condition.

6. The medium of claim 5, wherein the program causes the processor to provide information for displaying an ordered list of select failure conditions based on the rank ordering.

7. The medium of claim 5, wherein the program causes the processor to receive from a user a set of criteria associated with one or more degradation parameters.

8. The medium of claim 5, wherein the program causes the processor to provide information for displaying the performance measures for one or more failure conditions, including an indication of the degree of degradation severity associated with each performance measure.

9. A method comprising:

receiving, via a user interface, a plurality of user-specified potential failure conditions that have not yet occurred within the network;

simulating, by a processing system, each of the plurality of failure conditions on a model of the network, determining, by the processing system, a performance of the model of the network under each of the plurality of failure conditions, the performance being defined by a plurality of performance measures, mapping, by the processing system, each performance measure of each failure condition to one of a plurality of degrees of degradation severity, and ordering, by the processing system, the plurality of failure conditions in a rank order based on the degree of degradation severity of each performance measure for each failure condition.

10. The method of claim 9, including providing information for displaying an ordered list of select failure conditions based on the rank ordering.

11. The method of claim 9, including receiving from a user a set of criteria associated with one or more degradation parameters.

12. The method of claim 9, including providing information for displaying the performance measures for one or more failure conditions, including an indication of the degree of degradation severity associated with each performance measure.

* * * * *